(12) United States Patent
Wickander et al.

(10) Patent No.: US 11,898,403 B2
(45) Date of Patent: *Feb. 13, 2024

(54) LEAK-RESISTANT THREADED PIPE CONNECTION

(71) Applicant: FRAC STRING SOLUTIONS LLC, Conroe, TX (US)

(72) Inventors: Nels Peter Wickander, Conroe, TX (US); L Murray Dallas, Streetman, TX (US)

(73) Assignee: FRAC STRING SOLUTIONS LLC, Conroe, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/969,326

(22) Filed: Oct. 19, 2022

(65) Prior Publication Data
US 2023/0082305 A1    Mar. 16, 2023

Related U.S. Application Data

(63) Continuation of application No. 17/078,018, filed on Oct. 22, 2020, now Pat. No. 11,505,999.

(51) Int. Cl.
*E21B 17/042* (2006.01)
*F16L 15/06* (2006.01)
*F16L 15/00* (2006.01)

(52) U.S. Cl.
CPC .......... *E21B 17/042* (2013.01); *F16L 15/004* (2013.01); *F16L 15/06* (2013.01)

(58) Field of Classification Search
CPC ........ F16L 15/004; F16L 15/06; E21B 17/042
See application file for complete search history.

(56) References Cited

U.S. PATENT DOCUMENTS

| | | | |
|---|---|---|---|
| 4,984,829 A * | 1/1991 | Saigo | F16L 15/004 285/369 |
| 6,030,004 A | 2/2000 | Schock et al. | |
| 9,869,414 B2 | 1/2018 | Banker | |
| 9,885,214 B2 | 2/2018 | Pacheco | |
| 10,316,995 B2 | 6/2019 | Guillot | |
| 10,774,959 B1 | 9/2020 | Frederick, Jr. et al. | |
| 11,505,999 B2 * | 11/2022 | Wickander | F16L 15/06 |
| 2009/0200798 A1 | 8/2009 | Hamamoto et al. | |
| 2014/0367119 A1 | 12/2014 | David et al. | |
| 2015/0167869 A1 | 6/2015 | DeHart | |
| 2016/0123091 A1 | 5/2016 | Kawai et al. | |
| 2016/0123508 A1 | 5/2016 | Tejeda et al. | |
| 2018/0356014 A1 | 12/2018 | DeHart | |

* cited by examiner

*Primary Examiner* — David Bochna
(74) *Attorney, Agent, or Firm* — JK Intellectual Property Law, PA

(57) ABSTRACT

A leak-resistant pipe connection has an annular seal bulge on a pin end of the connection and a tapered seal area adjacent a secondary box shoulder of a box end of the connection. The annular seal bulge is coined on contact with the tapered seal area on initial make-up of the connection which provides a metal-to-metal seal that is very resistant to high-pressure fluid leakage even after the connection is subjected to extreme shear and tensile stresses.

19 Claims, 4 Drawing Sheets

LEAK-RESISTANT THREADED PIPE CONNECTION

CROSS REFERENCE TO RELATED APPLICATIONS

This is a continuation of U.S. patent application Ser. No. 17/078,018 filed Oct. 22, 2020, which issued on Nov. 22, 2022 as U.S. Pat. No. 11,505,999.

FIELD OF THE INVENTION

This invention relates in general to threaded pipe connections and, in particular, to a leak-resistant threaded pipe connection for pipes used to assemble work strings for the hydraulic fracturing of subterranean wells, and other high-pressure fluid delivery applications.

BACKGROUND OF THE INVENTION

Leak-resistant threaded connections for pipes used in high-pressure fluid applications are well known in the art. In general, such threaded connections provide a metal-to-metal seal between a box end and a pin end of the threaded connection. Such seals may work well when the pipe connections are not under extreme shear and/or tensile stresses. However, lateral well bores have become nearly ubiquitous now and a length of those lateral well bores has steadily increased as technology permits longer drilling reach. As well understood by those skilled in the art of hydrocarbon well design, an angle of the well bore between a kick-off point in a vertical portion of the well bore and a heel of the lateral well bore can be 40 degrees or more per hundred feet. As further understood, as a length of the lateral well bore increases, the number of "corkscrew" deviations in the well bore generally increases proportionately. Consequently, pushing and pulling a long work string into a highly-deviated lateral well bore for the purpose of hydraulically fracturing the well bore to complete or re-complete it places tremendous strain on threaded connections between pipes in a work string used to deliver hydraulic fracturing fluid to a selected area of the lateral well bore. As is well understood by those skilled in the art, a fluid pressure of hydraulic fracturing fluids pumped downhole to complete or re-complete a lateral well bore may be as high as 15,000 psi. At those fluid pressures, threaded connections already under high shear and tensile stresses may begin to leak, which can rapidly lead to undesirable pipe "wash", causing damage to the work string and interruption of the hydraulic fracturing process.

There therefore exists a need for a leak-resistant threaded pipe connection that is highly resistant to leakage at elevated fluid pressures while under shear, and tensile stresses.

SUMMARY OF THE INVENTION

It is therefore an object of the invention to provide a leak-resistant threaded pipe connection that is highly resistant to leakage at elevated fluid pressures while under shear and tensile stresses.

The invention therefore provides a leak-resistant threaded pipe connection, comprising: a pin end having external pin threads and a pin nose having an annular seal bulge adjacent a secondary shoulder of the pin end, the annular seal bulge having an apex; a box end having internal box threads arranged for connection with the external pin threads and a tapered seal area adjacent a box internal shoulder of the box end, the tapered seal area being tapered to an internal diameter that is smaller than an external diameter of the apex of the annular seal bulge; whereby initial make-up of the leak-resistant threaded pipe connection to a recommended make-up torque causes a plastic deformation of the annular seal bulge against the tapered seal area of the box end to provide a leak-resistant metal-to-metal seal.

The invention further provides a leak-resistant threaded pipe connection, comprising: a pin end having a primary pin shoulder, external pin threads and a pin nose with a secondary pin shoulder and an annular seal bulge adjacent the secondary pin shoulder; a box end having a primary box shoulder, internal box threads arranged for connection with the external pin threads and a tapered seal area adjacent a box internal shoulder, the tapered seal area being tapered from a box pre-taper area to a box post-taper area and having an internal diameter, where the tapered seal area meets the box post-taper area, that is smaller than an external diameter of the pin end at the apex of the annular seal bulge; whereby initial make-up of the leak-resistant threaded pipe connection to a recommended make-up torque causes a plastic deformation of the annular seal bulge against the tapered seal area of the box end to provide a leak-resistant metal-to-metal seal between the annular seal bulge and the tapered seal area.

The invention yet further provides a method of providing a leak-resistant threaded pipe connection, comprising: providing a pin end having a primary pin shoulder, external pin threads and a pin nose with a secondary pin shoulder and an annular seal bulge adjacent the secondary pin shoulder; providing a box end having a primary box shoulder, internal box threads arranged for connection with the external pin threads and a tapered seal area adjacent a box internal shoulder, the tapered seal area being tapered from a box pre-taper area to a box post-taper area to an internal diameter at the box post-taper area that is smaller than an external diameter of the pin end at the apex of the annular seal bulge; and, performing an initial make-up of the leak-resistant threaded pipe connection to a recommended make-up torque to cause a plastic deformation of the annular seal bulge of the pin end against the tapered seal area of the box end to provide a leak-resistant metal-to-metal seal between the annular seal bulge and the tapered seal area.

BRIEF DESCRIPTION OF THE DRAWINGS

Having thus generally described the nature of the invention, reference will now be made to the accompanying drawings, in which.

DETAILED DESCRIPTION OF THE PREFERRED EMBODIMENTS

The invention provides a leak-resistant threaded pipe connection particularly adapted for use in hydraulic fracturing pipe strings and the like. The leak-resistant threaded pipe connection has a pin nose with an annular seal bulge that engages a tapered seal area adjacent a secondary box shoulder of a box end of the connection, to provide a metal-to-metal fluid seal that is highly resistant to fluid pressure, even when the hydraulic fracturing pipe string is subjected to elevated shear and tensile stresses encountered during the hydraulic fracturing of selected areas of a lateral well bore.

| Part No. | Part Description |
|---|---|
| 10 | Hydraulic fracturing pipe string |
| 11 | Leak-resistant threaded pipe connection |
| 12 | Pin end |
| 14 | Box end |
| 15 | Connection length |
| 16 | Pipe center line |
| 18 | Box counterbore |
| 20 | Box counterbore length |
| 22 | Pin nose |
| 24 | Pin nose length |
| 26 | Pin threads |
| 28 | Box threads |
| 30 | Stab Flank |
| 32 | Load Flank |
| 34 | Stab flank angle |
| 36 | Load flank angle |
| 38 | Thread center line |
| 42 | Pitch line |
| 44 | Primary pin shoulder |
| 46 | Secondary pin shoulder |
| 48 | Annular seal bulge |
| 49 | Annular seal bulge apex |
| 50 | Thread major diameter |
| 52 | Thread minor diameter |
| 53 | Thread root |
| 54 | Thread root radius diameter |
| 56 | Thread crest |
| 58 | Thread crest width |
| 60 | Pin primary shoulder bevel |
| 62 | Pin primary shoulder undercut |
| 64 | Pin nose outer bevel |
| 66 | Pin nose inner bevel |
| 68 | Pin nose taper |
| 70 | Pin nose cylinder |
| 72 | Primary box shoulder |
| 74 | Secondary box shoulder |
| 76 | Tapered seal area |
| 78 | Box primary shoulder bevel |
| 80 | Box secondary shoulder outer radius |
| 82 | Box primary shoulder inner radius |
| 84 | Box pre-taper area |
| 86 | Box post-taper area |
| 88 | Box secondary shoulder bevel |

Figure 1:
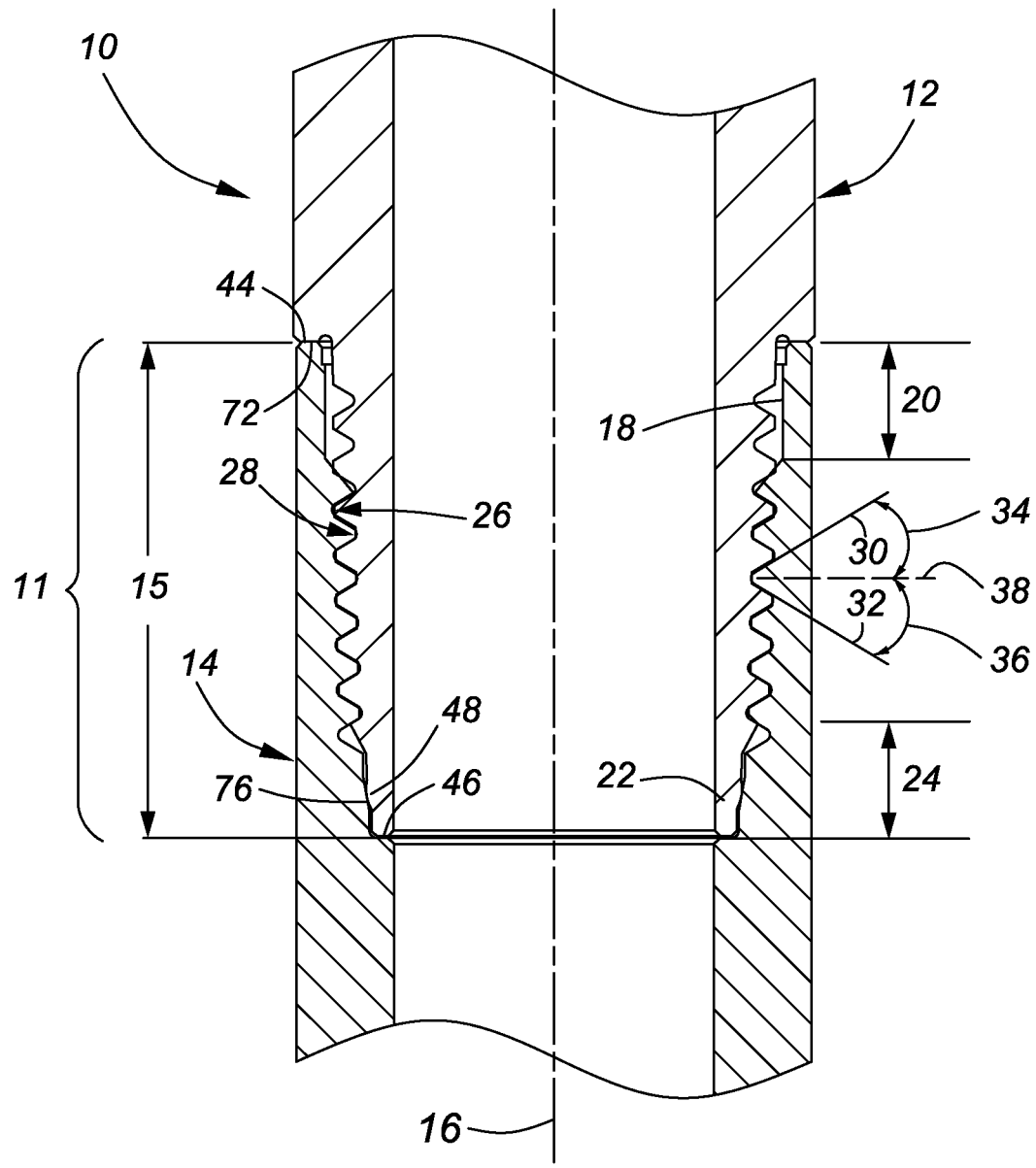
FIG. 1 is a cross-sectional view of a hydraulic fracturing pipe string with an embodiment of a leak-resistant threaded pipe connection in accordance with the invention.

FIG. 1 is a cross-sectional view of a hydraulic fracturing pipe string 10 with an embodiment of a leak-resistant threaded pipe connection 11 (hereinafter simply connection 11) in accordance with the invention. The connection 11 is provided by a pin end 12 and a box end 14, which are respectively provided on opposed ends of each pipe in the hydraulic fracturing pipe string 10. The connection 11 has a pin connection length 15, which is a distance between a primary pin shoulder 44 and a secondary pin shoulder 46.

When the connection 11 is made up, the primary pin shoulder 44 is in firm contact with a primary box shoulder 72 of the box end 14. The pin end 12 and the box end 14 share a common pipe center line 16. The pin end 12 has a pin nose 22 with a pin nose length 24, as will be explained below in more detail with reference to FIG. 2. The box end 14 has a box counterbore 18 with a box counterbore length 20, as will be explained below in more detail with reference to FIG. 3. The pin end 12 has pin threads 26 that engage box threads 28 of the box end 14. The pin threads 26 and the box threads 28 respectively have stab flanks 30 and load flanks 32. The stab flank 30 and load flank 32 form an angle divided into two equal angles, a stab flank angle 34 and a load flank angle 36, by a thread center line 38. In one embodiment, the stab flank angle 34 and the load flank angle 36 are respectively 30°. Leak-resistance is provided by a metal-to-metal seal provided by an annular seal bulge 48 on the pin nose 22 that is coined during initial make-up of the connection 11 by plastic deformation against a tapered seal area 76 of the box end 14, as will be explained below in more detail with reference to FIG. 4.

Figure 2:
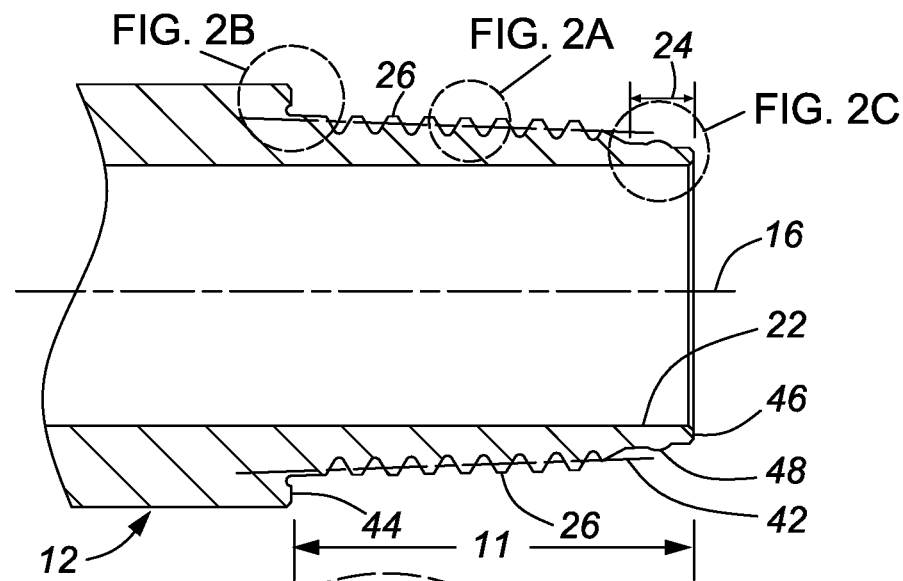
FIG. 2 is a cross-sectional view of a pin end of the leak-resistant threaded pipe connection shown in FIG. 1.

FIG. 2 is a cross-sectional view of the pin end 12 of the connection 11 shown in FIG. 1. The pin threads 26 of the pin end 12 are tapered at a thread taper defined by an imaginary pitch line 42 that extends through a center of each pin thread 26. In one embodiment the thread taper is less than 1" per foot in the thread pitch is less than 5 threads per foot. In one embodiment the thread taper is 0.875"-0.0.887" per foot (about 4.125°) and the thread pitch is 4 threads per foot. In one embodiment the pin nose 22 has a pin nose length 24 of 0.45"-0.4562" and the box counterbore 18 (see FIG. 1) has a box counterbore length 20 of 0.625"-0.688", which is about 28% longer than the pin nose length 24. The longer box counterbore length 20 facilitates joint makeup when the pin end 12 and box end 14 are not perfectly aligned along center line 16 during pipe joint make-up. The pin nose 22 includes the annular seal bulge 48, which will be explained below in more detail with reference to FIGS. 2C and 4.

Figure 2A:
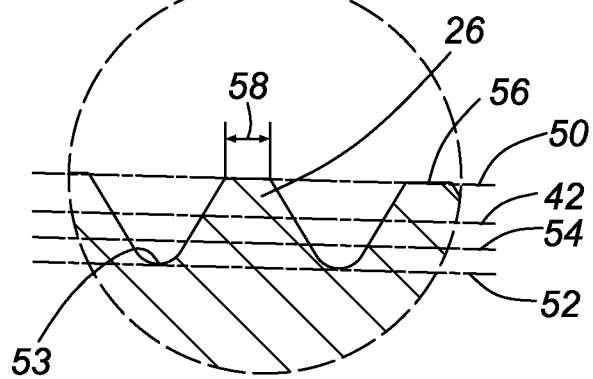
FIG. 2A is a detailed cross-sectional view of threads of the pin end shown in FIG. 2.

FIG. 2A is a detailed cross-sectional view of threads of the pin end 12 shown in FIG. 2. As explained above, the pin threads 26 are tapered at the taper angle of about 0.875" per foot defined by the pitch line 42. The pin threads 26 have a thread major diameter 50 defined by thread crests 56 of the respective pin threads 26, a thread minor diameter 52 defined by an imaginary line at a bottom of respective thread roots 53. In one embodiment a height of each pin thread 26, i.e. a length of an imaginary vertical line that extends from thread roots 53 to thread crests 56, is 0.119"-0.125" (about 0.122"). Each thread root 53 is defined by a circular arc having a center on the thread center line 38 (see FIG. 1) at a root radius diameter 54. In one embodiment, the root radius diameter 54 is 0.0375"-0.038", and each thread crest 56 has a thread crest width 58 of 0.065"-0.067". In one embodiment, each edge of the thread crest 56 is radiused to prevent galling of the pin threads 26.

Figure 2B:
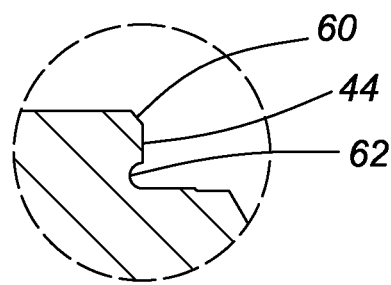
FIG. 2B is a detailed cross-sectional view of a primary pin shoulder of the pin end shown in FIG. 2.

FIG. 2B is a detailed cross-sectional view of the primary pin shoulder 44 of the pin end 12 shown in FIG. 2. The primary pin shoulder 44 includes a pin primary shoulder bevel 60 and a pin primary shoulder undercut 62. In one embodiment, a total width of the primary pin shoulder 44, from an inner side of the pin primary shoulder undercut 62 to an outer side of the pin primary shoulder bevel 60 is 0.411"-0.427" (about 0.419"). The pin primary shoulder bevel 60 is machined to a 44°-47° (about 45°) angle and has a maximum width of 0.028"-0.034" (about 0.031"). The pin primary shoulder undercut 62 has a radius of 0.031".

Figure 2C:
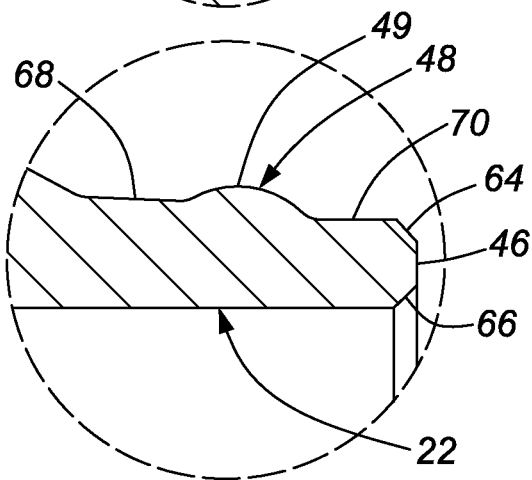
FIG. 2C is a detailed cross-sectional view of a pin nose of the pin end shown in FIG. 2.

FIG. 2C is a detailed cross-sectional view of the pin nose 22 of the pin end 12 shown in FIG. 2. As explained above, the pin nose 22 terminates in the secondary pin shoulder 46, which has a pin nose outer bevel 64 and a pin nose inner bevel 66. In one embodiment, the pin nose outer bevel 64 and the pin nose inner bevel 66 are each machined at an angle of about 45° and have a respective maximum length of about 0.031". The pin nose 22 further has a pin nose taper 68 above the annular seal bulge 48. In one embodiment, the pin nose taper 68 is the same as the thread taper, i.e. 0.875"-0.887" (about 0.875") per foot, and a length of the pin nose taper 68 is 0.125"-0.187". Below the annular seal bulge 48 is a pin nose cylinder 70 having, in one embodiment, a length of about 0.139", including the pin primary shoulder bevel 60. In one embodiment, the annular seal bulge 48 prior to initial make-up is a circular arc having a radius of about 0.125" and an annular seal bulge apex 49 at a top of the annular seal bulge 48. The conjunction of the annular seal bulge 48 with the pin nose taper 68 and the pin nose cylinder 70 is radiused at about 0.036".

Figure 3:
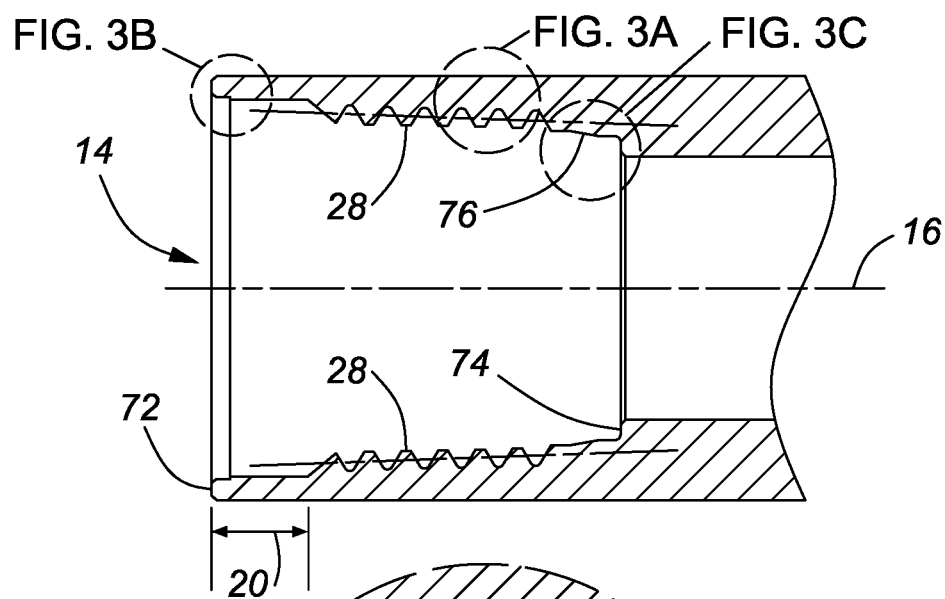
FIG. 3 is a cross-sectional view of a box end of the leak-resistant threaded pipe connection shown in FIG. 1.

FIG. 3 is a cross-sectional view of the box end 14 of the connection 11 shown in FIG. 1. The box end 14 has a primary box shoulder 72 and a secondary box shoulder 74. Located above the secondary box shoulder 74 is a tapered seal area 76, the function of which will be explained below with reference to FIG. 3C. The box threads 28 are identical to the pin threads 26 described above. In one embodiment, a distance from the primary box shoulder 72 to the secondary box shoulder 74 is about 0.005" longer than the connection length 15 to permit positive contact between the primary pin shoulder 44 and the primary box shoulder 72.

Figure 3A:
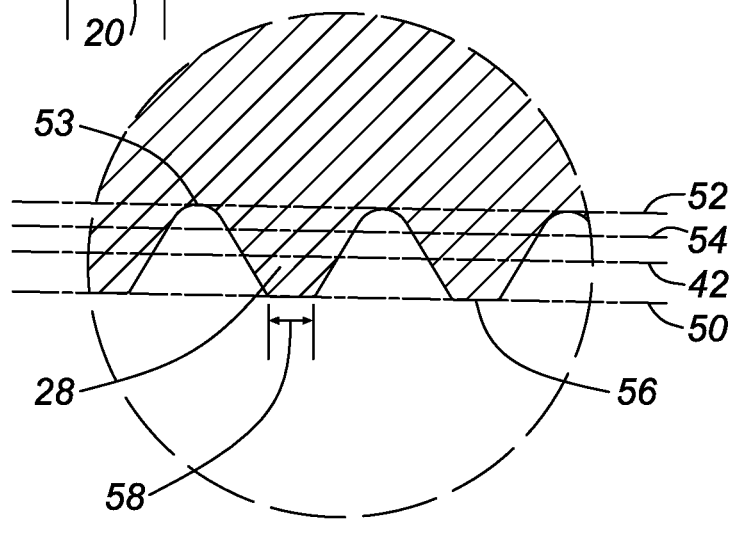
FIG. 3A is a detailed cross-sectional view of threads of the box end shown in FIG. 3.

FIG. 3A is a detailed cross-sectional view of the box threads 28 of the box end 14 shown in FIG. 3. As explained above, the box threads 28 are mirror images of the pin threads 26 and have the same pitch line 42, taper, thread major diameter 50, thread minor diameter 52, and thread root radius diameter 54.

Figure 3B:
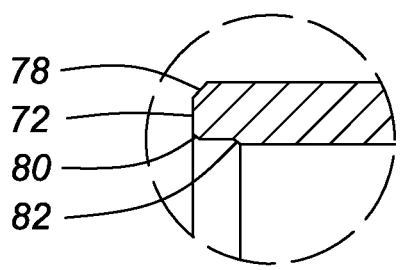
FIG. 3B is a detailed cross-sectional view of a primary box shoulder of the box end shown in FIG. 3.

FIG. 3B is a detailed cross-sectional view of the primary box shoulder 72 of the box end 14 shown in FIG. 3. The primary box shoulder 72 includes a box primary shoulder bevel 78 having an angle of 44°-47° (about 45°) and a length of 0.32"-0.48" (about 0.40"). The primary box shoulder 72 further includes a box primary shoulder outer radius 80 and a box primary shoulder inner radius 82. In one embodiment, the box primary shoulder inner radius 82 is spaced 0.125"-0.135" below the box primary shoulder outer radius 80, and both are machined to a radius of about 0.031".

Figure 3C:
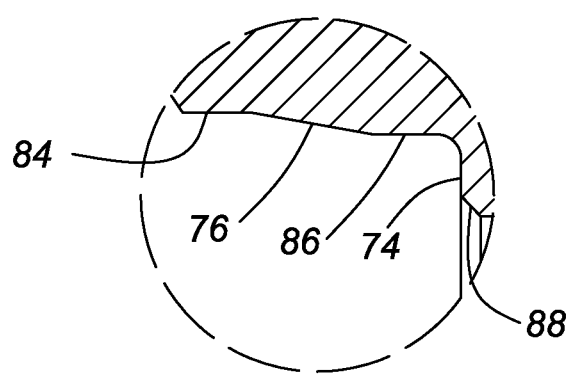
FIG. 3C is a detailed cross-sectional view of a secondary box shoulder of the box end shown in FIG. 3.

FIG. 3C is a detailed cross-sectional view of the secondary box shoulder 74 of the box end 14 shown in FIG. 3. Above the tapered seal area 76 is a box pre-taper area 84 and below the tapered seal area 76 is a box post taper area 86. The box pre-taper area 84 and the box post-taper area 86 are respectively cylindrical and parallel with the pipe center line 16. In one embodiment, the tapered seal area 76 tapers at a 10° angle from the box pre-taper area 84 to the box post-taper area 86. In one embodiment a distance from a top of the box pre-taper area 84 to the box secondary shoulder 74 is about 0.466". The box pre-taper area 84 has a length of about 0.111" and the box post-taper area 86 has a length of about 0.151". The secondary box shoulder 74 has a box secondary shoulder bevel 88, which is machined at an angle of about 45° a length of about 0.031".

Figure 4:
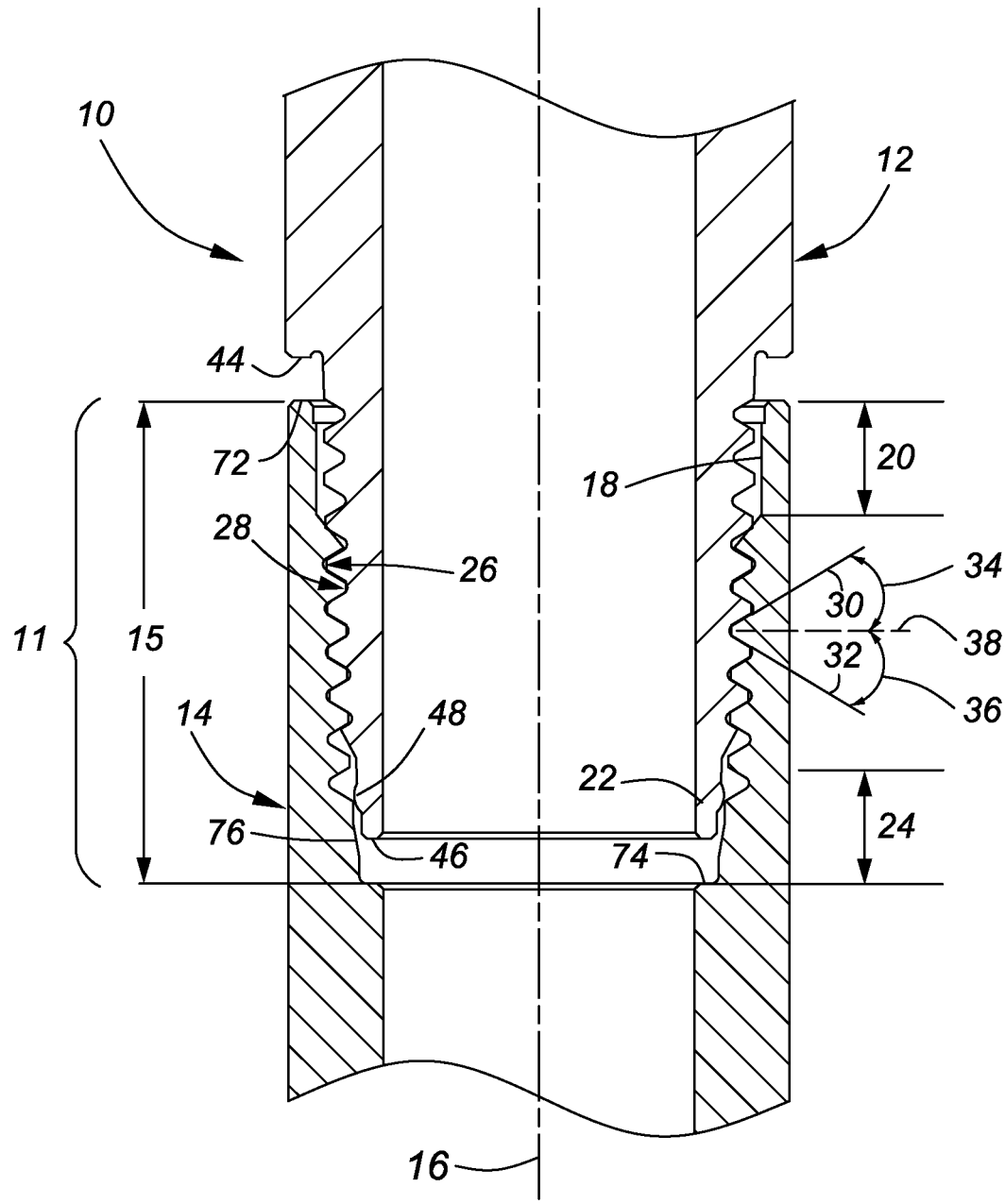
FIG. 4 is a detailed cross-sectional view of the leak-resistant pipe connection during initial make-up.

FIG. 4 is a detailed cross-sectional view of the connection 11 during initial make-up. As machined, the pin nose 22 at the apex 49 of the annular seal bulge 48 of the pin end 12 has an outer diameter that is about 0.020" smaller than an inner diameter of the box pre-taper area 84 of the box end 14, and about 0.050" larger than an inner diameter of the box post-taper area 86. Consequently, during initial "make-up" of the connection 11, the annular seal bulge 48 contacts the tapered seal area 76 of the box end 14 before the primary pin shoulder 44 contacts the primary box shoulder 72. As the make-up of the connection 11 is continued to a recommended make-up torque that is dependent on pipe diameter, as well understood by those skilled in the art, there is a coining interference between the annular seal bulge 48 of the pin end 12 and the tapered seal area 76 of the box end 14. This coining interference initially causes elastic deformation of the annular seal bulge 48, and as make-up torque is increased, a plastic deformation of the annular seal bulge 48 occurs until the primary pin shoulder 44 contacts the primary box shoulder 72. The annular seal bulge 48 is thereby permanently reshaped during the initial make-up, as shown in FIG. 1.

During subsequent make-ups of the leak-resistant threaded pipe connection 11, there is only elastic deformation of the annular seal bulge 48 of the pin nose 22. The seal provided by the metal-to-metal contact between the coined annular seal bulge 48 and the tapered seal area 76 has proven to be highly resistant to leakage. Testing has proven that that the hydraulic fracturing pipe string 10 remains leak-resistant even when under the extreme shear stress and tensile loads. Testing was conducted by an independent testing facility using 3.25" pipe (0.625" wall) pipe made-up using NCS-30 thread compound. The made-up pipe was subjected to a bend of 50° per 100' and 80,000 pounds of total tensile load at 22,500 psi of contained fluid pressure for a duration of 5 minutes, and no fluid leakage was observed. It has further been observed that the connection 11 remains leak-resistant even after inevitable scarring of the annular seal bulge 48 and the tapered seal area 76 caused by the presence of abrasive contaminants during the make-up of the connection 11.

The explicit embodiments of the invention described above have been presented by way of example only. The scope of the invention is therefore intended to be limited solely by the scope of the appended claims.

We claim:
1. A leak-resistant threaded pipe connection, comprising:
a pin end having a primary pin shoulder, external pin threads having a thread taper and a pin nose with a secondary pin shoulder and an annular seal bulge having an apex with an external diameter at the apex, the annular seal bulge being between the external pin threads and the secondary pin shoulder;
a box end having a primary box shoulder, internal box threads having the thread taper arranged for connection with the external pin threads and a tapered seal area between the internal box threads and a box internal shoulder, the tapered seal area being tapered from a box pre-taper area to a box post-taper area at an angle that is greater than the thread taper, the tapered seal area having an internal diameter at the box post-taper area that is smaller than the external diameter of the pin end at the apex of the annular seal bulge of the pin end;
whereby on initial make-up to a recommended make-up torque, the annular seal bulge is plastically deformed against the tapered seal area to provide a leak-resistant metal-to-metal seal between the pin end and the box end.
2. The leak-resistant pipe connection as claimed in claim 1 wherein the annular seal bulge has a radius of about 0.125".

3. The leak-resistant pipe connection as claimed in claim 1 wherein the taper of the tapered seal area is about 10° with respect to a pipe center line of the pin end.

4. The leak-resistant pipe connection as claimed in claim 1 wherein the box pre-taper area and the box post-taper area are parallel to a pipe center line of the box end.

5. The leak-resistant pipe connection as claimed in claim 4 wherein the diameter of the apex of the annular seal bulge is about 0.020" smaller than an inner diameter of the box pre-taper area and about 0.050" larger than an inner diameter of the box post-taper area.

6. The leak-resistant pipe connection as claimed in claim 1 wherein the internal box threads and the external pin threads have a thread taper of less than 1" per foot.

7. The leak-resistant pipe connection as claimed in claim 1 wherein the internal box threads and the external pin threads have a thread pitch of 4 threads per inch.

8. A method of providing a leak-resistant threaded pipe connection by performing an initial make-up to a recommended make-up torque by coining an annular seal bulge of a pin end of the threaded pipe connection, the pin end having a primary pin shoulder, external pin threads and a pin nose with a secondary pin shoulder and the annular seal bulge between the external pin threads and the secondary pin shoulder, and a box end of the threaded pipe connection having a primary box shoulder, internal box threads adapted for connection with the external pin threads and a tapered seal area between the box internal threads and a box internal shoulder, the tapered seal area being tapered from a box pre-taper area to a box post-taper area and having an internal diameter at the box post-taper area that is smaller than an external diameter of the pin end at an apex of the annular seal bulge, whereby the annular seal bulge is plastically deformed and coined against the tapered seal area when the threaded pipe connection is made-up to the recommended make-up torque.

9. A leak-resistant threaded pipe connection, comprising:
a pin end having external pin threads with a thread taper, a pin nose having a secondary pin shoulder, a pin nose taper between the external pin threads and an annular seal bulge having an apex with an external diameter at the apex, and a pin nose cylinder between the annular seal bulge and the secondary pin shoulder,
a box end having internal box threads adapted for connection with the external pin threads, a secondary box shoulder, a box pre-taper area, a tapered seal area, and a box post-taper area between the internal box threads and the secondary box shoulder, the tapered seal area being tapered at an angle greater than the thread taper, the box pre-taper area having an internal diameter that is larger than an external diameter of the apex of the annular seal bulge and the box post-taper area having an internal diameter that is smaller than the external diameter of the apex of the annular seal bulge;
whereby on initial make-up of the leak-resistant threaded pipe connection to a recommended make-up torque, the annular seal bulge is plastically deformed and coined against the tapered seal area of the box end to provide a metal-to-metal fluid seal.

10. The leak-resistant pipe connection as claimed in claim 9 wherein the annular seal bulge is a circular arc in cross-section, the circular arc having a radius of about 0.125".

11. The leak-resistant pipe connection as claimed in claim 9 wherein the box pre-taper area and the box post-taper area are respectively parallel with a pipe center line of the box end.

12. The leak-resistant pipe connection as claimed in claim 11 wherein the tapered seal area is tapered at an angle of about 10° with respect to the box pre-taper area.

13. The leak-resistant pipe connection as claimed in claim 9 wherein the diameter of the pin nose at the apex of the annular seal bulge is about 0.020" smaller than an inner diameter of the box pre-taper area and about 0.050" larger than an inner diameter of the box post-taper area.

14. The leak-resistant pipe connection as claimed in claim 9 wherein the thread taper of the internal box threads and the external pin threads is less than 1" per foot.

15. The leak-resistant pipe connection as claimed in claim 14 wherein the thread taper is about 0.875" per foot.

16. The leak-resistant pipe connection as claimed in claim 9 wherein the internal box threads and the external pin threads have a respective thread pitch of 4 threads per inch.

17. The leak-resistant pipe connection as claimed in claim 16 wherein the internal box threads and the external pin threads have a respective root radius of about 0.038".

18. The leak-resistant pipe connection as claimed in claim 9 wherein a stab flank angle and a load flank angle of the internal box threads and the external pin threads are identical.

19. The leak-resistant pipe connection as claimed in claim 18 wherein the stab flank angle and the load flank angle is about 30°.

* * * * *